Nov. 18, 1924.  
W. S. RUNNELS  
1,515,619  
SAWING AND TRIMMING MACHINE  
Filed Feb. 18, 1922  
6 Sheets-Sheet 1
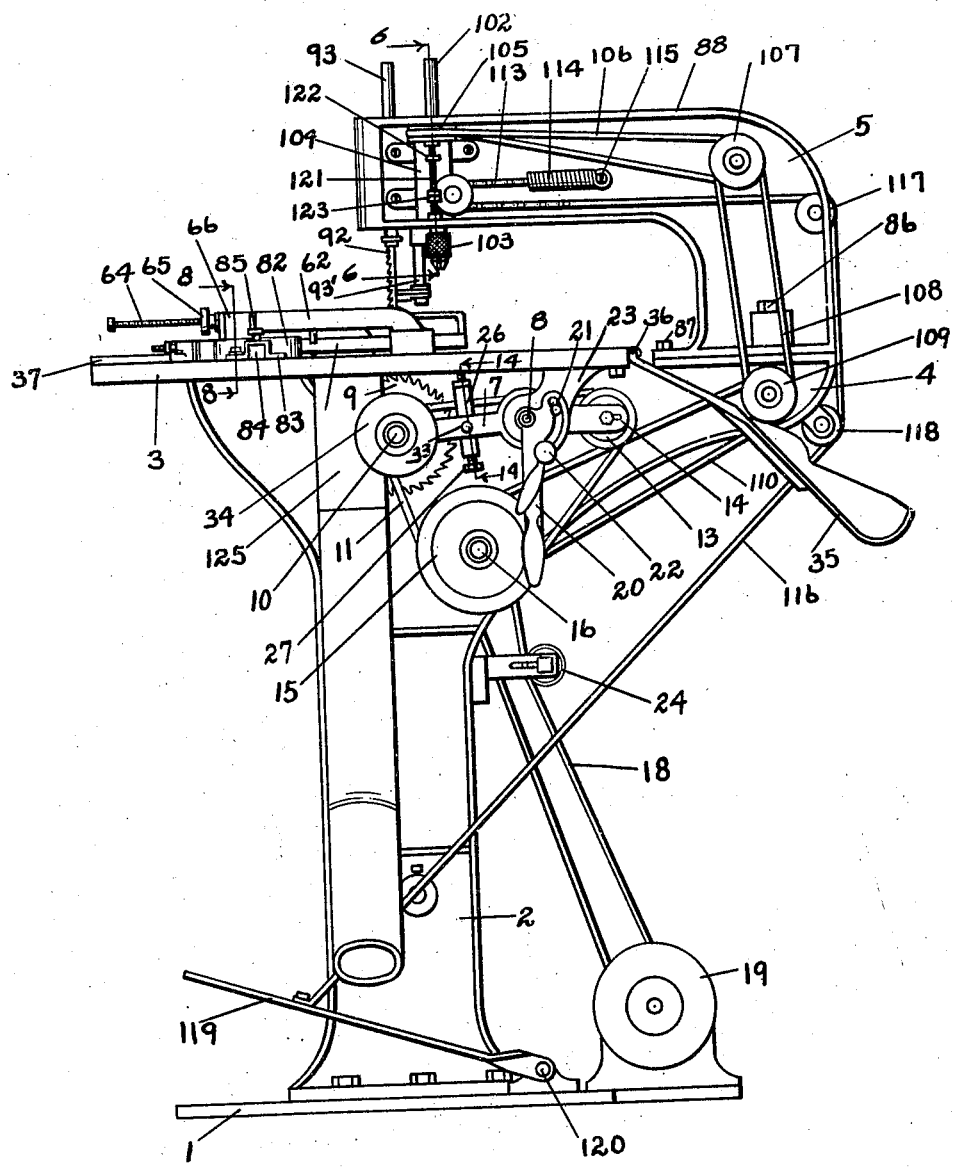
FIG. I.
INVENTOR.  
Walter S. Runnels  
BY *Chappell Earl*  
ATTORNEYS

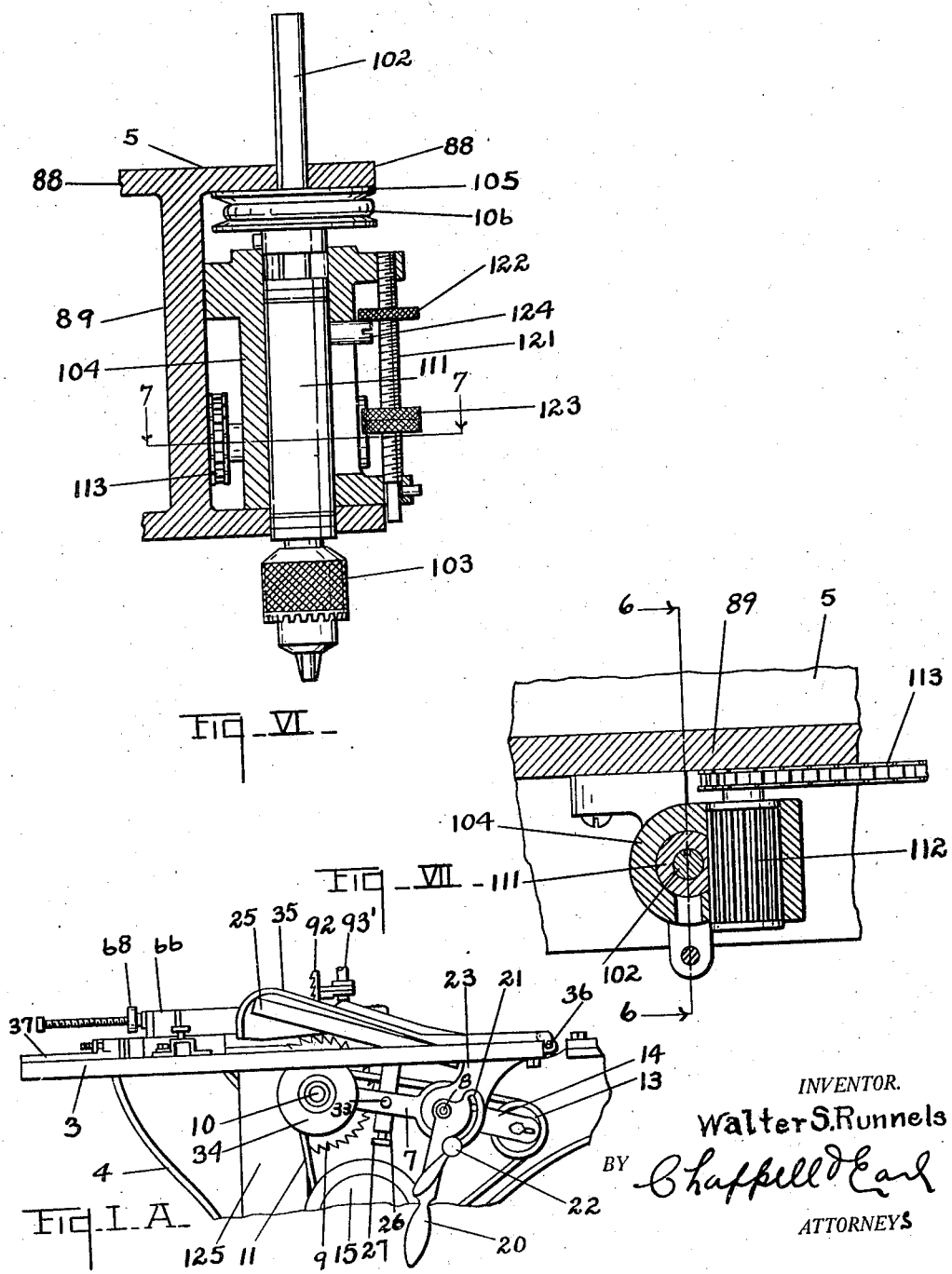

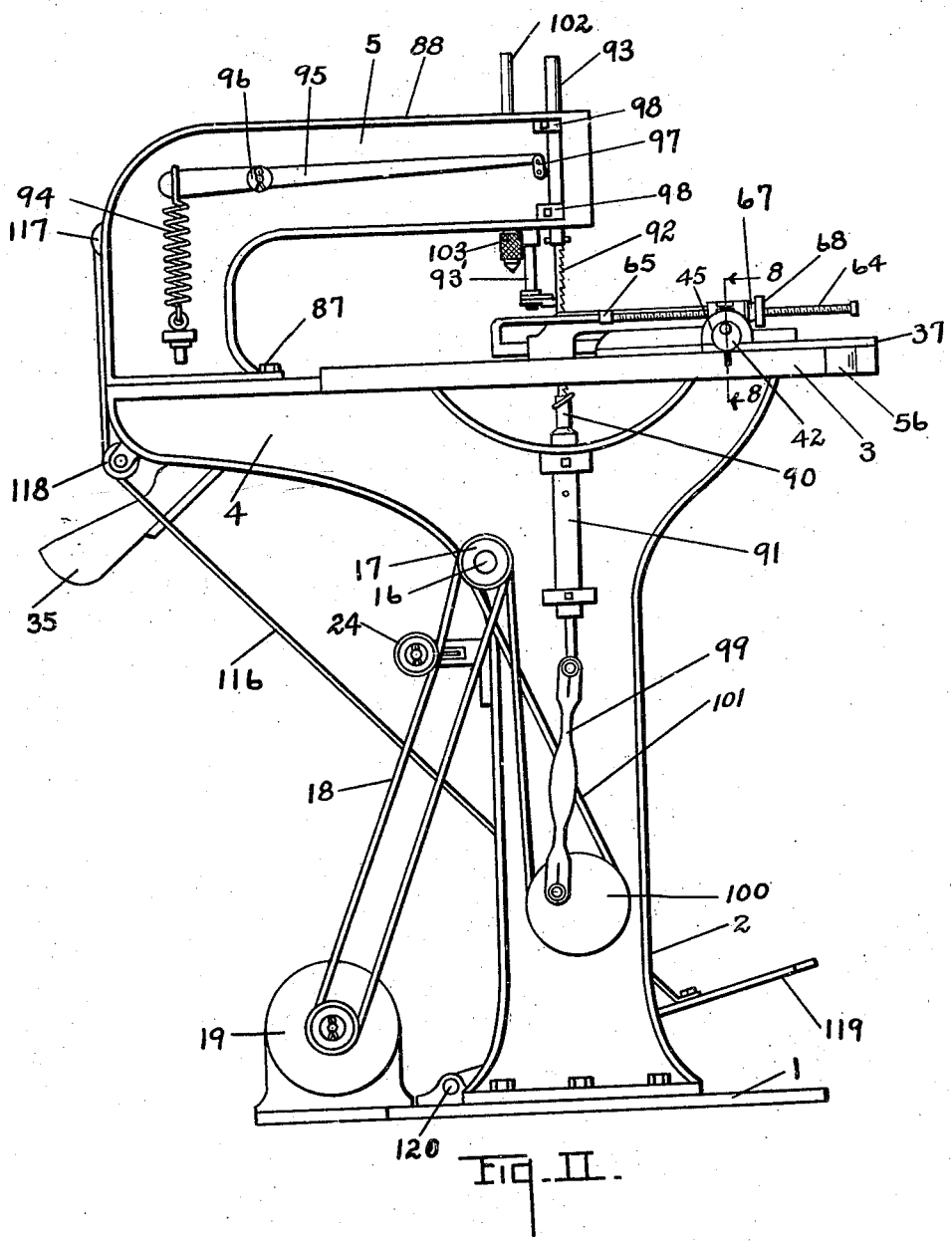

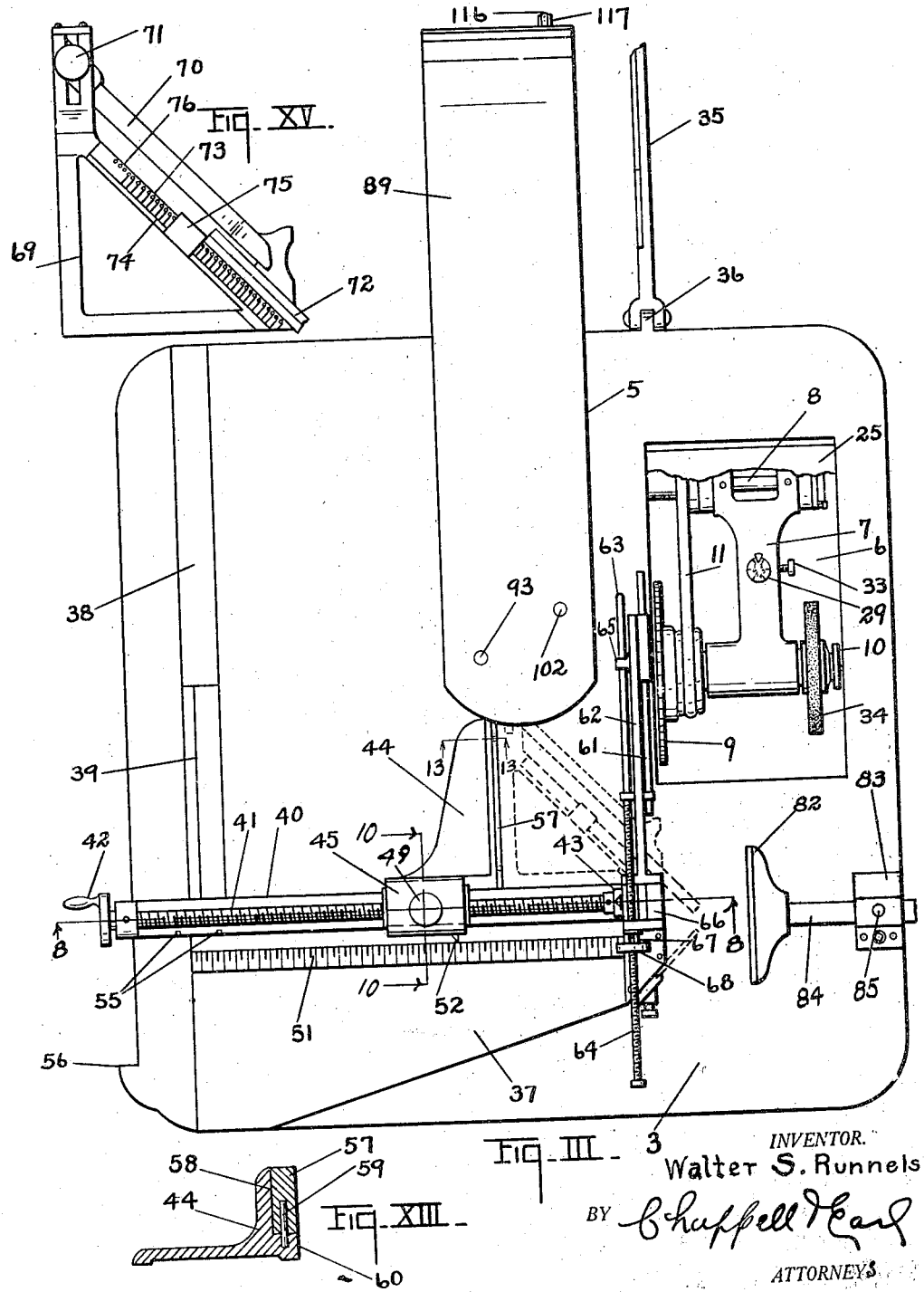

Nov. 18, 1924.
W. S. RUNNELS
SAWING AND TRIMMING MACHINE
Filed Feb. 18, 1922
1,515,619
6 Sheets-Sheet 5
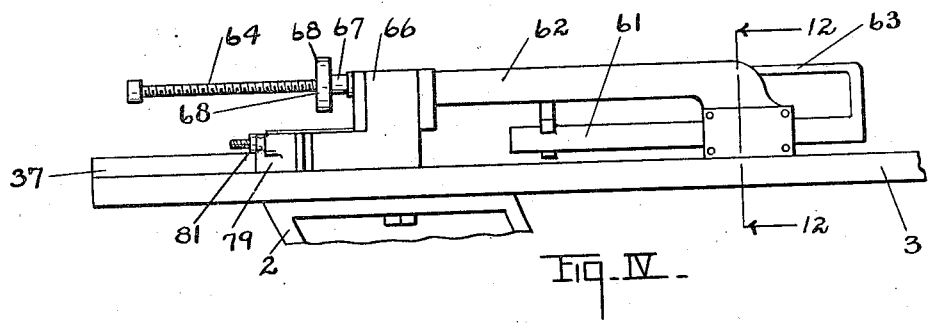
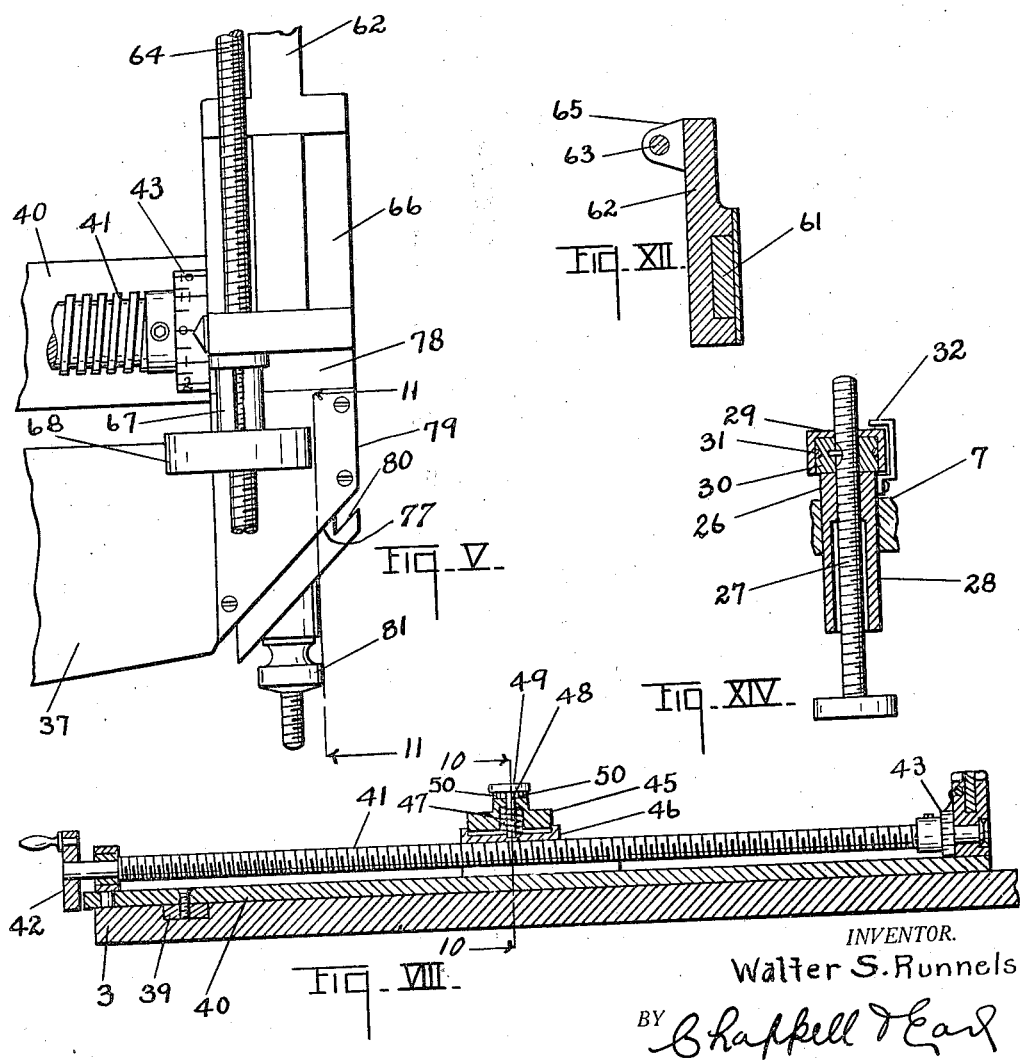
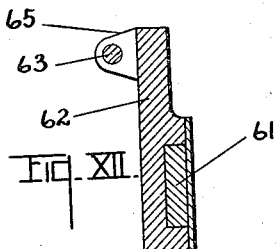
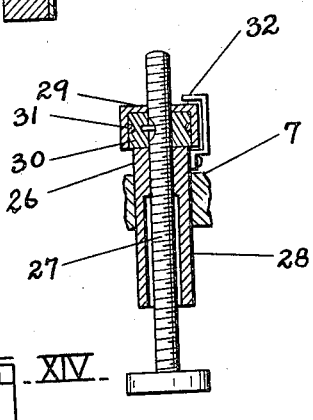
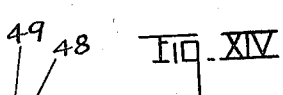
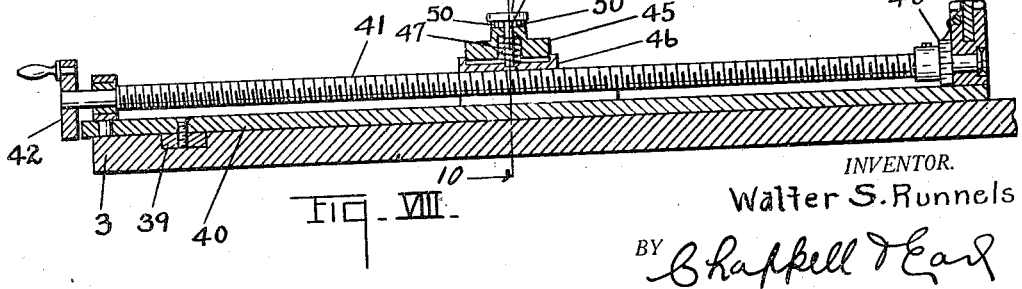
INVENTOR.
Walter S. Runnels
BY Chappell & Earl
ATTORNEYS

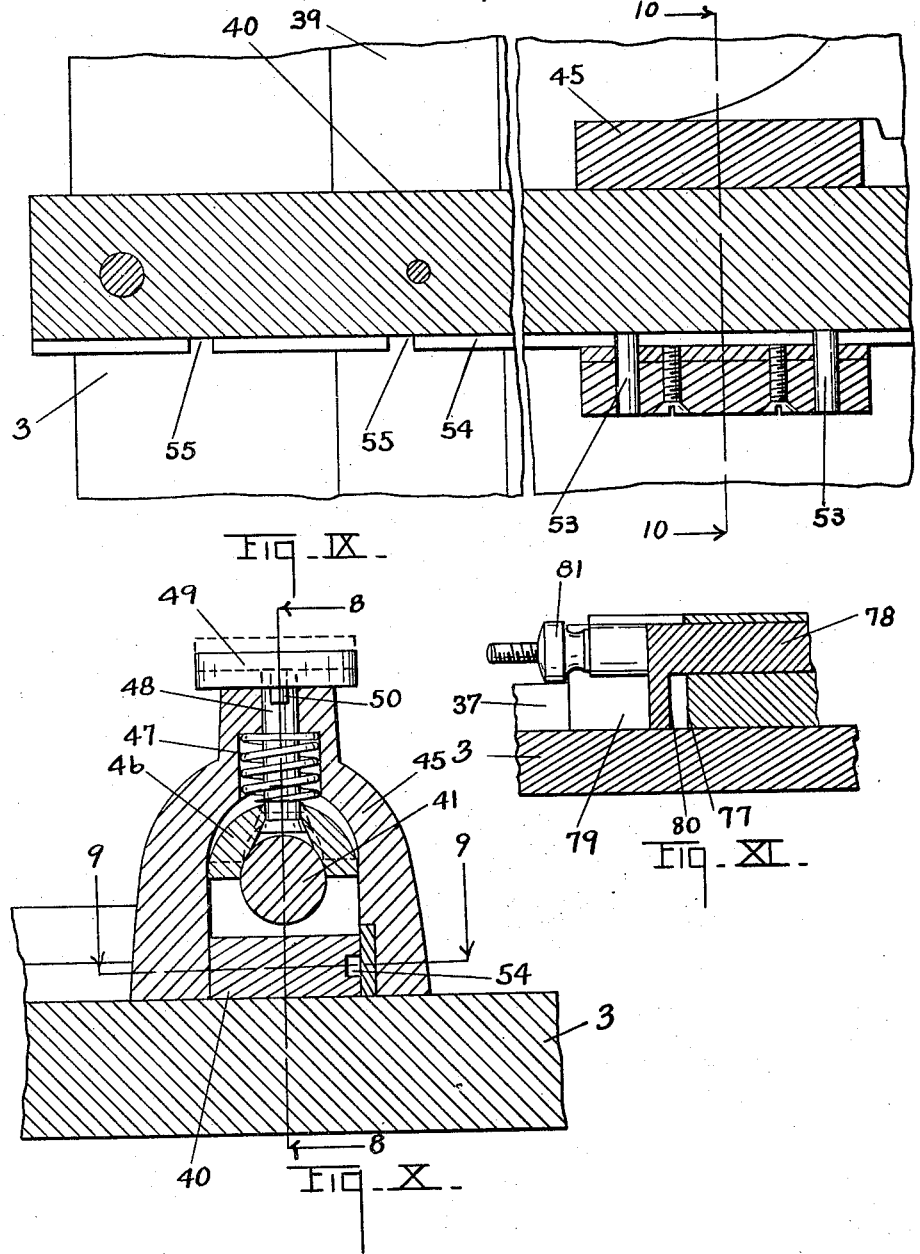

Patented Nov. 18, 1924.

1,515,619

UNITED STATES PATENT OFFICE.

WALTER S. RUNNELS, OF KALAMAZOO, MICHIGAN.

SAWING AND TRIMMING MACHINE.

Application filed February 18, 1922. Serial No. 537,542.

*To all whom it may concern:*

Be it known that I, WALTER S. RUNNELS, a citizen of the United States, residing at the city and county of Kalamazoo, State of Michigan, have invented certain new and useful Improvements in Sawing and Trimming Machines, of which the following is a specification.

This invention relates to improvements in sawing and trimming machines.

My improved sawing and trimming machine is especially designed by me for use in sawing and trimming electrotypes, stereotypes, linotypes, halftones and the like, and performing other operations thereon, and I have illustrated my improvements as I have embodied the same in a machine for that purpose, certain features of my improvements are, however, adapted and desirable for use in machines designed for other work.

The main objects of the invention are:

First, to provide a machine of the class described which is adapted to readily perform various operations in the fitting of electrotypes, linotypes and the like.

Second, to provide a structure of the class described which is very rapidly manipulated to secure the work and to perform the desired operations.

Third, to provide in a machine of the class described an improved work holding machine adapted for quick manipulation to secure or release the work.

Fourth, to provide in a structure of the class described an improved means for undercutting and gaging undercuts.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a righthand side elevation of my improved sawing and trimming machine, the same being adjusted to inoperative position and the saw guard being shown open or in inoperative position.

Fig. I^A is a fragmentary righthand side elevation with the saw adjusted to one working position and the saw guard in operative position.

Fig. II is a lefthand elevation with the parts in the position shown in Fig. I.

Fig. III is a plan view, parts of the work holder being shown by dotted lines.

Fig. IV is an enlarged detail elevation of the work holder.

Fig. V is an enlarged fragmentary plan of the work holder.

Fig. VI is a detail view partially in vertical section on a line corresponding to line 6—6 of Figs. I and VII, showing details of the drill or router spindle.

Fig. VII is a detail view partially in horizontal section on a line corresponding to line 7—7 of Fig. VI.

Fig. VIII is a detail view mainly in vertical section on a line corresponding to line 8—8 of Figs. I, III and X, showing further details of the work gage and holder.

Fig. IX is a detail horizontal section on a line corresponding to line 9—9 of Fig. X, showing details of the work gage.

Fig. X is an enlarged detail vertical section on a line corresponding to line 10—10 of Figs. III, VIII and IX.

Fig. XI is a detail section on a line corresponding to line 11—11 of Fig. V, showing further details of the work holder.

Fig. XII is a detail section on a line corresponding to line 12—12 of Fig. IV.

Fig. XIII is a detail section on a line corresponding to line 13—13 of Fig. III, showing details of the work gage.

Fig. XIV is a detail vertical section on a line corresponding to line 14—14 of Fig. I, showing details of the undercutting gage.

Fig. XV is a plan view of the workholder attachments designed for securing lefthand miter cuts.

In the drawing similar reference characters refer to similar parts throughout the several views, and the sectional views are taken looking in the direction of the little arrows at the ends of the section lines.

Referring to the drawing, the base 1 is of suitable size to receive the pedestal 2 having a table 3 mounted thereon. The pedestal has a rearwardly projecting bracket 4 having an angled arm or head 5 mounted thereon to overhang the rear portion of the table. The table has an opening 6 therein through which the saw may be swung to and from the work. The saw hanger or arm 7 is mounted below the table on the rock shaft 8, so that the saw 9 carried thereby may be swung through the opening 6. The arbor 10 of the saw 9 is mounted on the outer end of the arm 7, the arbor being driven from the belt 11 which passes over the belt tightening idler 13 on the arm 14 to the pulley 15 on the shaft 16 mounted on the pedestal. This shaft 16 is connected by the pulley 17 and the belt 18 to the shaft of the motor 19 mounted on the base. The motor is shown conventionally.

The rock shaft 8 is provided with an adjusting lever 20 by means of which the saw hanger or supporting arm 7 may be adjusted, the lever having a segmental slot 21 therein engaged by the clamping pin 22 for securing the arm 7 in its adjusted position, this pin being carried by the bracket 23 on the under side of the table, the rock shaft being mounted on the bracket. With this arrangement of parts the saw may be adjusted to perform the desired work without affecting its driving connections.

The belt 18 is provided with a tightener pulley 24. The opening 6 is provided with a cover 25 which is adapted to close the opening when the cover is dropped down to inoperative position. This cover is supported above the saw by means of the gage, designated generally by the numeral 26, mounted on the saw hanger. This gage comprises a gage screw 27 disposed through the barrel 28 mounted on the arm 7. The screw is provided with an indicia disk 29 mounted upon a block 30 pinned to the screw, the indicia member being frictionally held on the block by means of the spring 31. A pointer 32 is mounted upon the supporting barrel of the gage to coact with the index. The gage normally serves to support the cover when the saw is swung to operative position and it also serves as a gaging means for securing under cuts, the method of operation for securing such under cuts being as follows:

First, adjust the saw to a position two to four points (printer's measurement) above the table;

Second, adjust screw 27 by means of the knob on the lower end until it projects about one inch or 6 picas above the dial or indicia disk 29;

Third, loosen the set screw 33 and adjust the complete gauge unit until it strikes the cover 25 and then lock in position;

Fourth, hold the cover by means of a flat object such as the smooth side of a linotype slug and adjust screw 27 until the cover is level with the top of the saw teeth;

Fifth, raise the cover and, holding the screw from turning, move the dial to the zero mark;

Sixth, turn the adjusting screw to left, each full turn of the dial equaling six points;

Seventh, hold the cover with one hand raising the saw as far as possible without raising the cover above the level of the table and lock the saw in position.

The arbor is also preferably provided with a grinding wheel 34. A saw guard 35 is pivoted at 36 at the rear end of the table to be swung out of operative position, as shown in Fig. I, leaving the top of the table clear or to be swung forwardly, resting upon the cover 25, as shown in Fig. I<sup>A</sup>.

I will now describe the workholder and work gaging means. This comprises a slide or carriage 37 resting upon the top of the table and guided thereon by the groove 38, this carriage having a guiding slide 39 traveling in the groove. A bar 40 is mounted on the front edge of the carriage. A micrometer or gage screw 41 is mounted on this bar and provided with an adjusting hand wheel 42. The screw is provided with a micrometer screw or gaging dial 43. The gage finger or member 44 rests upon the table in front of the carriage and is provided with a yoke 45 embracing the bar 40 and the screw 41 and carrying a half nut 46 coacting with the screw. This nut is held yieldingly in engagement with the screw by means of the coiled spring 47. A pin 48 provided with a handpiece 49 is connected to the half nut 46 so that it may be lifted against the tension of the spring and, by giving it a half turn, the pins or lugs 50 are withdrawn from notches provided in the top of the yoke so that the lugs rest upon the yoke holding the parts in elevated position, as shown in dotted lines in Fig. X, thereby permitting the rapid adjustment of the gage member to the work. A scale 51 is provided on the carriage for quick adjustment or rough adjustment purposes, the yoke of the gage member 44 being provided with a pointer 52 coacting with this scale 51. This allows the rapid adjustment, as stated, when the nut is disengaged by sliding the gage member on the table and final accurate adjustment through means of the screw 41.

The yoke 45 has a pair of angularly disposed pins 53 which engage the groove 54 in the rear edge of the bar 40, thus holding the yoke in position. To permit convenient engaging and releasing of the gage member the wall of the groove is provided with notches 55 near the outer end of the bar so that the gage member can be adjusted to register the pins with these slots or notches and the yoke lifted from or engaged with the bar.

To prevent the accidental withdrawal of the carriage from the table, I provide the table with a stop 56 with which the projecting end of the bar 40 is adapted to engage when the carriage is in its fully retracted position.

The work gage is provided with a removable bar 57 which I designate as "twelve point attachement," the face of the work gage or holder being rabbeted at 58 to receive this removable bar, the outer face of which is flush with the face of the work gage. Pins 59 hold this "twelve point attachment" to the gage member. By this connection the bar 57 can be readily removed by lifting upwardly but when in position is properly supported to receive the work. When this bar 57 is removed the projecting bottom portion 60 of the gage member will project under the work clamping bar 61, which permits the clamping and sawing of work as short as one pica or .166 of an inch.

The work clamping bar 61 is slidably mounted on the forwardly projecting arm 62 on the work carriage 37. The work clamping bar is adjusted by means of the clamping rod 63 having a screw portion 64. This rod is supported by a guide 65 on the arm 62 and a support 66 on the carriage. A split clamping nut 67 is provided for securing this rod in its adjusted position, the nut being provided with a finger-piece 68, its split end coacting with the support 66 to engage the nut. This work clamp is that shown in my Letters Patent No. 1,408,831 dated March 7, 1922.

To secure lefthand miter cuts I provide a vise or work holder member 69 of triangular shape adapted to seat against the work gage 44. This work holder is provided with a clamping member 70 secured in its adjusted positions by clamping screw 71 at the outer end of the work holder. 72,—see Fig. XV, indicates work within the holder. The side or face 73 of this angle cutting work holder is at an angle of 45° and is provided with a scale 74 for the gage block 75. A series of holes 76 are adapted to receive a pin on the gage block, the pin not being illustrated, so that the gage block 75 may be adjusted to the desired position. With the work thus supported it is presented to the saw at a 45° angle.

I also provide what I designate as a righthand miter work holder,—see Figs. V and XI. The rear righthand corner of the work carriage is beveled or planed off at an angle of 45° at 77 and adapted to receive the arm 78 of the work clamp or holder 79, so that the work may be clamped between the face 77 of the work holder and the opposing face 80 of the clamp,—see Fig. XI. A clamping nut 81 is provided for the work holder 79. A piece of work may thus be clamped at an angle of 45° to secure a righthand miter.

I also provide what I designate as a "batter" gage 82 which is slidably supported in the bracket 83 mounted on the table opposite the work holder. This bracket is preferably detachably mounted so that if desired it may be removed to clear the face of the table. The "batter" gage has a stem 84 arranged through the bracket 83 and adjustably secured therein by means of a set screw 85. This is of particular advantage in gaging pieces to be mitered and is arranged to co-operate with both the left and right hand miters, the batter gage being set and the work for both right and left hand miters being placed in the holders therefor with their ends against the gage. This enables the turning of both miters at the same time and greatly facilitates the work. It also may be used for squaring linotype blocks and the like, the blocks being laid against the gage and fed into the saw, or it may be used to square up the ends of several blocks or to tap the work into alignment. Other uses will be found in the practical operation of the machine.

The overhanging arm or head 5 is formed separately from the arm 4 of the pedestal and is mounted thereon by means of the king or pivot bolt 86 and the screws 87. This holds the head rigidly in place. However, by removing the screws 87 the head 5 can be swung to one side of the table, leaving its top entirely free. The head is of an I cross section, that is, it has flanges 88 projecting at each side of its central web 89, thus providing housings for parts carried by the head. These parts are a jig-saw, drill and router mechanism. The jig-saw plunger 90 is supported in a guide 91 on the lefthand side of the pedestal. This plunger is connected to the lower end of the saw blade 92, the upper end of the blade being connected to the retracting plunger 93, which is connected to the retracting spring 94 through the lever 95 pivoted at 96 and connected to the plunger 93 by the link 97. The plunger 93 is mounted in the guides 98 on the head and the spring and lever described are housed within the lefthand channel of the head. The plunger 90 is connected by the pitman 99 to the crank wheel 100, which is connected to the shaft 16 by the belt 101. A guide 93' is provided for the saw blade engaging saw in a spaced relation to the surface of the table on which the work rests. The drill and router spindle 102 is provided with a chuck 103. This spindle is mounted in a bearing 104 disposed in the righthand channel of the head,—see Figs. I, VI and VII. The spindle is provided with a pulley 105 connected by the belt 106 to a pulley 107 disposed at the rear angle of the head, the pulley 107 being connected by a belt 108 to a pulley 109 mounted on the bracket 4 of the pedestal, and this pulley 109 is connected by the belt 110 to a pulley on the shaft 16, the pulley on the shaft 16 not being illustrated.

The spindle 102 is carried by a sleeve 111 having a rack on one side thereof with which the gear 112 on the bearing member 104 meshes. This gear 112 is driven through the sprocket chain 113, one end of which is connected to the coiled spring 114 secured to the head at 115, and the other end to a cable 116 disposed over the guide pulleys 117 and 118 and connected to the foot lever 119 pivoted on the base at 120.

With this arrangement a downward movement of the end of the lever feeds the spindle downwardly. To limit the stroke of the spindle I provide a gage screw 121 carried by the bearing member 104 and having stop nuts 122 and 123 thereon adapted to coact with the stop member 124 on the sleeve 111. These drill spindle parts and driving and feed connections therefor are mainly housed within the righthand channel of the head.

The sawdust or discharge pipe or conduit 125 is disposed on the righthand side of the pedestal with its upper end in proper relation to the saw,—see Fig. I. The shaft portion of the pedestal is also of I cross section and serves as a housing for certain operating parts and partially houses this conduit,—see Figs. I and I^A.

My improved machine is, as stated, especially adapted for use in trimming electrotypes and the like and performing other operations required in connection with objects of that character and I have illustrated and described my improvements in the form in which I have embodied them in a machine designed for that purpose. I have not attempted to illustrate or describe various modifications and adaptations of my improvements which I contemplate for certain classes of work, as I believe the disclosure made will enable those skilled in the art to which my invention relates to embody or adapt the same as may be desired.

Having thus described my invention, what I claim as new and desire to secure by Letters Patent, is:—

1. In a structure of the class described, the combination of a table having a groove-like way therein, a carriage slidable on said table and having a slide engaging said way, a guide bar mounted on said carriage at the front thereof in spaced relation thereto, the forward edge of said guide bar constituting the work supporting face of the carriage, said bar being provided with a groove in its rear edge, a gage member resting on the table in front of said carriage with its rear edge in sliding contact with the front edge of said bar, its face being at right angles to the face of said bar, a screw mounted above said bar, a yoke on said gage member embracing said screw and bar and provided with pins engaging the said groove therein, said bar being provided with notches adjacent its end permitting the engagement and disengagement of the yoke when the pins are in register with the notches, and a nut member mounted on said yoke to coact with said screw and detachably engaged therewith.

2. In a structure of the class described, the combination of a table having a groove-like way therein, a carriage slidable on said table and having a slide engaging said way, a guide bar mounted on said carriage at the front thereof in spaced relation thereto, the forward edge of said guide bar constituting the work supporting face of the carriage, said bar being provided with a groove in its rear edge, a gage member resting on the table in front of said carriage with its rear edge in sliding contact with the front edge of said bar, its face being at right angles to the face of said bar, a screw mounted above said bar, a yoke on said gage member embracing said screw and bar and provided with pins engaging the said groove therein, said bar being provided with notches adjacent its end permitting the engagement and disengagement of the yoke when the pins are in register with the notches.

3. In a structure of the class described, the combination of a table, a carriage slidable on said table, a guide bar mounted on said carriage, said bar being provided with a groove in its rear edge, a gage member resting on the table in front of said carriage, a screw mounted above said bar, a yoke on said gage member embracing said screw and bar and provided with pins engaging the said groove therein, said bar being provided with notches adjacent its end permitting the engagement and disengagement of the yoke when the pins are in register with the notches, and a nut member mounted on said yoke to coact with said screw.

4. In a structure of the class described, the combination of a table, a carriage slidable on said table, a guide bar mounted on said carriage, said bar being provided with a groove in its rear edge, a gage member resting on the table in front of said carriage, a screw mounted above said bar, a yoke on said gage member embracing said screw and bar and provided with pins engaging the said groove therein, and a nut member mounted on said yoke to coact with said screw.

5. In a structure of the class described, the combination of a stationary work table by which the work is slidably supported having a groove-like way therein, a gauge carriage slidable on said table and having a slide engaging said way, a gauge slide bar mounted at the front of said carriage, a gage screw mounted above said slide bar, a gage member resting on said table in front of said carriage and provided with a slide yoke embracing said screw and engaging said slide bar, a split nut carried by said yoke to coact with said screw, a spring for holding said nut yieldingly in coacting engagement with said screw, and means for holding said nut out of engagement with said screw thereby permitting rapid adjustment of said gage member, said gage member being provided with a pointer and said carriage with a scale operatively associated with said pointer.

6. In a structure of the class described, the combination of a stationary work table by which the work is slidably supported having a groove-like way therein, a gauge carriage slidable on said table and having a slide engaging said way, a gauge slide bar mounted at the front of said carriage, a gage screw mounted above said slide bar, a gage member resting on said table in front of said carriage and provided with a slide yoke embracing said screw and slidably engaging said slide bar, a split nut carried by said yoke to coact with said screw, a spring for holding said nut yieldingly in coacting engagement with said screw, and means for holding said nut out of engagement with said screw thereby permitting rapid adjustment of said gage member.

7. In a structure of the class described, the combination of a stationary work table by which the work is slidably supported, a gauge carriage slidable on said table, a gauge slide bar mounted on said carriage, a gage screw mounted above said slide bar, a gage member provided with a slide yoke embracing said screw and slidably engaging said slide bar, a feed member carried by said yoke to coact with said screw, and means for disengaging said feed member thereby permitting rapid adjustment of said gage member, said gage member being provided with a pointer and said carriage with a scale operatively associated with said pointer.

8. In a structure of the class described, the combination of a work table by which the work is slidably supported, a gauge carriage slidable on said table, a gauge slide bar mounted on said carriage, a gage screw mounted above said slide bar, a gage member provided with a slide yoke embracing said screw and slidably engaging said slide bar, a feed member carried by said yoke to coact with said screw, and means for disengaging said feed member thereby permitting rapid adjustment of said gage member.

9. In a structure of the class described, the combination with a stationary work table by which the work is slidably supported, of a gauge carriage, a gage member, an adjusting screw for said gage member mounted on said carriage transversely thereof, a feed nut on said gage member detachably coacting with said screw whereby the gage member may be rapidly adjusted or adjusted by means of said screw, said carriage being provided with a scale disposed parallel to the path of the gage member and said gage member having a pointer coacting with said scale, and a clamping member adapted to clamp the work.

10. In a structure of the class described, the combination of a stationary work table by which the work is slidably supported, a gauge carriage, a gage screw mounted on said carriage, a gage member operatively associated with said screw and adapted to be disengaged therefrom permitting rapid adjustment of the gage member, said carriage being provided with gage indicia for such rapid adjustment, said screw being provided with rotation indicia indicating subdivisions of said gage indicia.

11. In a structure of the class described, the combination with a table, of a carriage slidable on said table, a gage member resting on said table in front of said carriage and provided with a work face with a longitudinal rabbet-like upwardly facing recess therein, a removable face bar for said gage member removably fitting in said recess and provided with downwardly projecting retaining pins, an adjusting screw for said gage member mounted on said carriage transversely thereof, a feed nut on said gage member coacting with said screw, and a clamping member adapted to clamp the work, said recess in said gage member being adapted to receive said clamping member when said face bar is removed.

12. In a structure of the class described, the combination with a table, of a carriage slidable on said table, a gage member resting on said table in front of said carriage and provided with a work face with a longitudinal rabbet-like upwardly facing recess therein, a removable face bar for said gage member removably fitting in said recess an adjusting screw for said gage member mounted on said carriage transversely thereof, a feed nut on said gage member coacting with said screw, and a clamping member adapted to clamp the work, said recess in said gage member being adapted to receive said clamping member when said face bar is removed.

13. In a structure of the class described, the combination with a table, of a carriage, a gage member resting on said table in front of said carriage, the face of said gage member being disposed at right angles to the face of the carriage, means for adjusting said gage member, transversely of the face of the carriage, a work holder angled to rest on the table in the angle formed by the gage and the face of the carriage, said work holder having an inclined work clamping face, a work clamp adjustably mounted on said work holder to clamp the work against its said face, a gage block adjustably mounted on said work holder to coact with the work resting against the inclined work holding face thereof, and a work clamp mounted on said carriage to clamp the work in said work holder against the face of the carriage.

14. In a structure of the class described, the combination with a table, of a carriage, a gage member resting on said table in front of said carriage, the face of said gage member being disposed at right angles to the face of the carriage, means for adjusting said gage member transversely of the face of the carriage, a work holder angled to rest on the table in the angle formed by the gage and the face of the carriage, said work holder having an inclined work clamping face, a work clamp adjustably mounted on said work holder to clamp the work against its said face, and a work clamp mounted on said carriage to clamp the work in said work holder against the face of the carriage.

15. In a structure of the class described, the combination with a table, of a carriage, a gage member resting on said table in front of said carriage, the face of said gage member being disposed at right angles to the face of the carriage, means for adjusting said gage member, transversely of the face of the carriage, a work holder angled to rest on the table in the angle formed by the gage and the face of the carriage, said work holder having an inclined work clamping face, a work clamp adjustably mounted on said work holder to clamp the work against its said face, a gage block adjustably mounted on said work holder to coact with the work resting against the inclined work holding face thereof.

16. In a structure of the class described, the combination with a table, of a carriage, a gage member resting on said table in front of said carriage, the face of said gage member being disposed at right angles to the face of the carriage, means for adjusting said gage member, transversely of the face of the carriage, a work holder angled to rest on the table in the angle formed by the gage and the face of the carriage, said work holder having an inclined work clamping face, and a work clamp adjustably mounted on said work holder to clamp the work against its said face.

17. In a structure of the class described, the combination with a table and a saw of a carriage slidably mounted on said table, said carriage having a rearwardly facing work clamping face disposed at an angle to the plane of travel of the carriage, a work clamp adjustably mounted on said carriage to coact with said clamping face, and an adjusting screw for said work clamp whereby the work may be clamped to the carriage and advanced therewith to the saw.

18. In a structure of the class described, the combination with a stationary work table by which the work is slidably supported and a saw, of a gauge carriage slidably mounted on said table, said carriage having a rearwardly facing work clamping face disposed at an angle to the plane of travel of the carriage, and a work clamp adjustably mounted on said carriage to coact with said clamping face.

19. In a structure of the class described, the combination with a table and a saw, of a carriage slidably mounted on said table, said carriage having a rearwardly facing work clamping face disposed at an angle, a work gage resting on said table in front of the carriage and adjustably supported thereby, and a work clamp mounted on said carriage to coact with said clamping face, whereby the work may be clamped to the carriage and advanced therewith to the saw or disposed on said table in front of said carriage and supported by said gage.

20. In a structure of the class described, the combination with a stationary work table by which the work is slidably supported and a saw, of a gauge carriage slidable on said table, a gage member screw mounted on said carriage, a gage member on said screw, a work holder provided with a work clamp and gage and adapted to be positioned on said table in front of said carriage and supported by said gage to support work in an inclined relation relative to the path of travel of said carriage, a second work holder on said carriage adapted to support work at another angle to said saw, and an adjustable gage member mounted on said table oppositely to said work holders.

21. In a structure of the class described, the combination with a stationary work table by which the work is slidably supported and a saw, of a gauge carriage slidable on said table, a gage member screw mounted on said carriage, a gage member on said screw, a work holder provided with a work clamp and gage and adapted to be positioned on said table in front of said carriage and supported by said gage to support work in an inclined relation relative to the path of travel of said carriage, and an adjustable gage member mounted on said table oppositely to said work holder.

22. In a structure of the class described, the combination with a stationary work table by which the work is slidably supported and a saw, of a gauge carriage slidable on said table carriage, a gage member screw mounted on said carriage, a gage member on said screw, a work holder provided with a work clamp and gage and adapted to be positioned on said table in front of said carriage and supported by said gage to support work in an inclined relation relative to the path of travel of said carriage, a second work holder on said carriage adapted to support work at another angle to said saw.

23. In a structure of the class described, the combination with a stationary work table by which the work is slidably supported and a saw, of a gauge carriage slidable on said table, a gage member screw mounted on said carriage, a gage member on said screw, a work holder provided with a work clamp and gage and adapted to be positioned on said table in front of said carriage and supported by said gage to support work in an inclined relation relative to the path of travel of said carriage.

24. In a structure of the class described, the combination of a table having an opening therein, a carriage on said table provided with work gaging and clamping means, a swinging arbor supporting arm, means for adjusting and securing said arm in its adjusted positions, an arbor carried by said arm, a driving means for said arbor permitting the swinging of said arm, a saw on said arbor adapted to be swung through the opening in said table, a cover for said opening, a member on said arm adapted to engage said cover to open and support it in its open position, and a saw guard mounted on said table at the rear of said cover and adapted to be supported by the cover when in operative position or to be adjusted to inoperative position at the rear of the cover.

25. In a structure of the class described, the combination of a table having an opening therein, a carriage on said table provided with work gaging and clamping means, a swinging arbor supporting arm, means for adjusting and securing said arm in its adjusted positions, an arbor carried by said arm, a driving means for said arbor permitting the swinging of said arm, a tool mounted on said arbor adapted to be swung through the opening in said table, a cover for said opening, a gage member on said arm comprising a sleeve mounted on said arm for vertical adjustment therein, a screw carried by said sleeve adapted to engage the under side of the cover, said screw being provided with an indicia dial, and a pointer on said sleeve coacting with said indicia dial, all coacting for the purpose specified.

26. In a structure of the class described, the combination of a table having an opening therein, a carriage on said table provided with work gaging and clamping means, a swinging arbor supporting arm, means for adjusting and securing said arm in its adjusted positions, an arbor carried by said arm, a driving means for said arbor permitting the swinging of said arm, a tool mounted on said arbor adapted to be swung through the opening in said table, a cover for said opening, a gage member on said arm comprising a sleeve mounted on said arm for vertical adjustment therein, a screw carried by said sleeve adapted to engage the under side of the cover, all coacting for the purpose specified.

27. In a structure of the class described, the combination of a table having an opening therein, a carriage on said table provided with work gaging and clamping means, a swinging arbor supporting arm, means for securing said arm in its adjusted positions, an arbor carried by said arm, a driving means for said arbor permitting the swinging of said arm, a tool on said arbor adapted to be swung through the opening in said table, a cover for said opening, and an adjustable gage on said arm coacting with said cover.

28. In a structure of the class described, the combination of a table having an opening therein, a carriage on said table provided with work gaging and clamping means, a swinging arbor supporting arm, means for securing said arm in its adjusted positions, an arbor carried by said arm, a driving means for said arbor permitting the swinging of said arm, and a tool on said arbor adapted to be swung through the opening in said table, and an adjustable gage on said arm.

29. In a structure of the class described, the combination with a table and a saw, of a carriage slidably mounted on said table, a gage member on said carriage, a work holder adapted to support work at an angle to the line of travel of the carriage removably associated with said carriage and gage, a second work clamp on said carriage adapted to support the work at an angle to the work supported by said removable work holder, and a gage member adjustable transversely to the line of travel of the carriage mounted on said table in position to coact with the work supported by both of said work holders.

30. In a structure of the class described, the combination with a table and a saw, of a carriage, a work holder adapted to support work at an angle to the line of travel of the carriage removably associated with said carriage, a second work clamp on said carriage adapted to support the work at an angle to the work supported by said removable work holder, and a gage member adjustable transversely to the line of travel of the carriage mounted on said table in position to coact with the work supported in both of said work holders.

31. In a structure of the class described, the combination with a table and a saw, of a carriage, a pair of work holders operatively associated with said carriage and adapted to support work at opposing angles, and a gage member adjustable transversely to the line of travel of the carriage mounted on said table in position to coact with the work supported in both of said work holders.

In witness whereof, I have hereunto set my hand and seal.

WALTER S. RUNNELS. [L. S.]